(12) United States Patent
Fukuhara et al.

(10) Patent No.: US 9,132,801 B2
(45) Date of Patent: Sep. 15, 2015

(54) SEAT BELT RETRACTOR AND METHOD FOR ASSEMBLING SPINDLE OF SEAT BELT RETRACTOR

(75) Inventors: Yoshio Fukuhara, Yokohama (JP); Junichi Nagatomo, Yokohama (JP)

(73) Assignee: AUTOLIV DEVELOPMENT AB, Vargarda (SE)

(*) Notice: Subject to any disclaimer, the term of this patent is extended or adjusted under 35 U.S.C. 154(b) by 918 days.

(21) Appl. No.: 13/383,763

(22) PCT Filed: May 19, 2010

(86) PCT No.: PCT/JP2010/058437
§ 371 (c)(1),
(2), (4) Date: Jan. 12, 2012

(87) PCT Pub. No.: WO2011/007614
PCT Pub. Date: Jan. 20, 2011

(65) Prior Publication Data
US 2012/0111986 A1    May 10, 2012

(30) Foreign Application Priority Data
Jul. 15, 2009   (JP) .................. 2009-166314

(51) Int. Cl.
*B60R 22/34* (2006.01)
(52) U.S. Cl.
CPC ......... *B60R 22/34* (2013.01); *B60R 2022/3402* (2013.01); *Y10T 29/49826* (2015.01)
(58) Field of Classification Search
USPC ................. 242/376, 376.1, 379, 384
See application file for complete search history.

(56) References Cited

U.S. PATENT DOCUMENTS

| 4,549,705 A | 10/1985 | Fohl |
| 4,619,419 A * | 10/1986 | Essler ............... 242/376.1 |
| 4,620,357 A | 11/1986 | Fohl |
| 6,354,528 B1 * | 3/2002 | Nagata et al. ............ 242/374 |

FOREIGN PATENT DOCUMENTS

JP          113553          9/1981

OTHER PUBLICATIONS

Translated International Search Report of PCT/JP2010/058437 Mailed on Jun. 15, 2010, one page.

* cited by examiner

*Primary Examiner* — Emmanuel M Marcelo
*Assistant Examiner* — Angela Caligiuri
(74) *Attorney, Agent, or Firm* — Brinks Gilson & Lione

(57) ABSTRACT

A seatbelt retractor and method of incorporating a spindle into a retractor frame. The seatbelt retractor includes a spindle having a recessed portion in a cylindrical surface for retracting a webbing, and a retractor frame including two flat plate-shaped side walls that are provided in parallel via an interval (A) in order to support the spindle, each of the two side walls being provided with a circular through hole having a diameter (C). An element on a first end of the spindle is contained within a range of a distance (D) from a deepest portion of the recessed portion, and an element on a second end of the spindle is contained within a range of a distance (B) from the deepest portion of the recessed portion. The distance (D) is smaller than the height (C), and the distance (B) is smaller than the interval (A).

6 Claims, 8 Drawing Sheets

(a)　　　　　　　　(b)

Prior Art

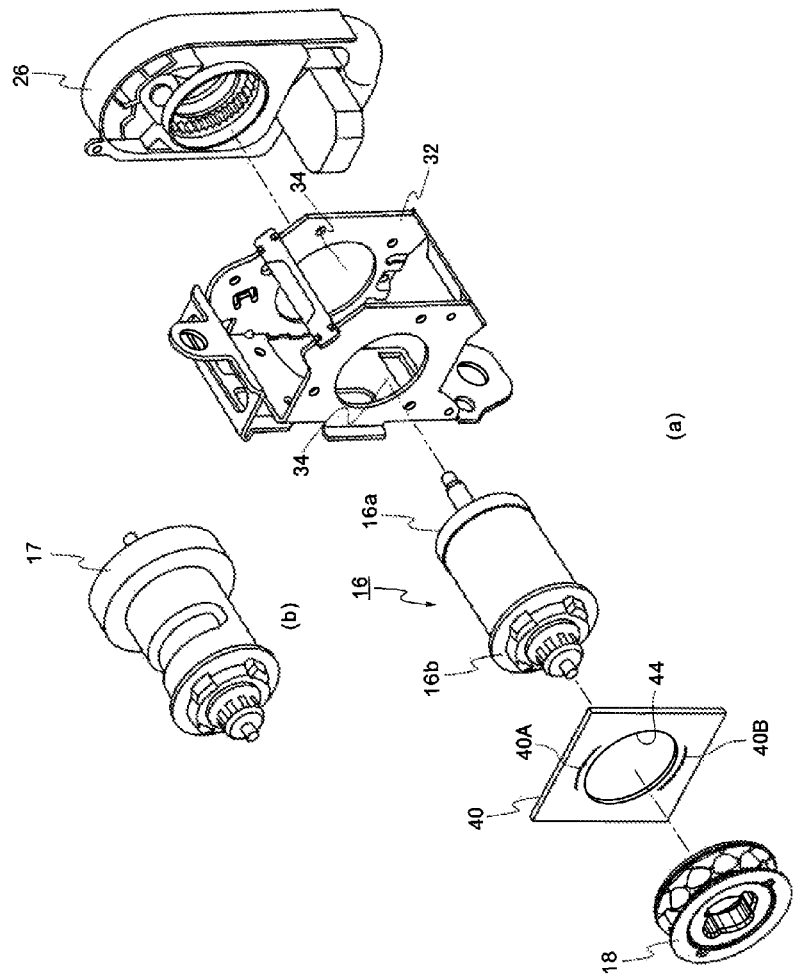
Fig. 8                    Prior Art

SEAT BELT RETRACTOR AND METHOD FOR ASSEMBLING SPINDLE OF SEAT BELT RETRACTOR

BACKGROUND OF THE INVENTION

1. Field of the Invention

The present invention relates to a seatbelt retractor and a method for assembling a spindle of a seatbelt retractor.

2. Related Technology

A seatbelt device is conventionally attached to a seat of a vehicle so that during a vehicle emergency, such as an emergency stop or a collision in which a large deceleration acts on the vehicle, an occupant is restrained and prevented from being flung forward by inertial force. A seatbelt device includes a retractor disposed behind or inside a seat back. The retractor retracts a webbing (a belt) for restraining the occupant during an emergency using a rotary force while also allowing the webbing to be unreeled freely. Hence, under normal conditions, the webbing remains in close contact with a body of the occupant at all times without slackening, regardless of movement of the occupant.

The webbing is actually retracted by a spindle disposed in the retractor. The spindle is supported to be free to rotate about an axis, and retracts the webbing using force or the like from a spring provided in a retraction spring device, an electric motor, or the like disposed in the retractor. When the vehicle receives a powerful impact during a collision or the like, a pretensioner device provided in the retractor restrains the occupant by locking unreeling of the webbing.

When the body of the occupant is restrained rapidly, however, a great load may be exerted on the body of the occupant via the webbing. To mitigate this excessive load, the retractor is further provided with a load limiter mechanism. During a collision, the load limiter mechanism detects the tension of the locked webbing. When the tension increases beyond a fixed value, an energy absorption member provided in the load limiter mechanism deforms so that a shaft of the spindle rotates in a webbing unreeling direction (a slackening direction). As a result, the webbing is unreeled automatically, thereby lightening the load exerted on the occupant.

To assemble the retractor, typically, as shown in FIG. 6A, a spindle 16 is incorporated by being inserted from an outer side into a circular through hole 14 provided in a side wall of a retractor frame 12. However, an additional component having a larger diameter than the spindle 16, such as a load limiter mechanism 17 (see FIG. 6B) similar to that described above, is attached to an end of the spindle 16, and therefore the spindle 16 cannot be inserted into the circular through hole 14 in the retractor frame 12 from the outer side.

To solve this problem, the diameter of the circular through hole 14 in the retractor frame 12 may simply be increased so that the spindle 16 can be inserted therein. However, a pinion 18 that performs a rotary motion substantially in alignment with the axis of the spindle 16 is disposed on an exterior of the retractor frame 12, and as a result of this rotary motion, the pinion 18 slides while contacting the exterior of the retractor frame 12, as shown in FIG. 7.

When an energy absorption (EA) mechanism (not shown) that unreels the webbing (not shown) by a predetermined length while applying at least a fixed unreeling resistance thereto is operative, the webbing is pulled in a direction of an arrow 19 in FIG. 7, whereby the pinion 18 slides relative to a load bearing 20A (FIG. 6A) formed on the retractor frame 12. When a pretensioner device 26 is operative, on the other hand, the pinion 18 is pulled in a direction of an arrow 21 in FIG. 7 so as to slide relative to a load bearing 20B shown in FIG. 6A.

Hence, the load bearings 20A, 20B for receiving force from the pinion 18 must be formed in the retractor frame 12, and therefore the circular through hole 14 cannot be increased in size. When a retractor frame 32 having a larger circular through hole 34 is used, as shown in FIG. 8, an additional component (a plate 40) having a smaller circular through hole 44 that matches a sliding diameter of the pinion 18 is required. Here, the pinion 18 slides relative to load bearings 40A, 40B provided on the plate 40.

Further, in the typical spindle 16, spindle end portions 16a and 16b are supported by the circular through hole 14 in the retractor frame 12 so that the spindle 16 can be connected to a mechanism on the exterior of the retractor frame 12. In other words, the circular through hole 14 doubles as a bearing for the spindle 16. Therefore, when the circular through hole in the retractor frame 12 is increased in size, further additional components (bearings or the like for the spindle end portions 16a and 16b, for example) are required to ensure that the end portions of the spindle 16 are supported by the circular through hole 14 in the retractor frame 12, which is problematic in terms of cost.

As another solution, Japanese Examined Utility Model Application Publication No. H7-35805, for example, discloses a safety belt retractor in which side walls of a U-shaped casing open out angularly and a deformation portion, formed by cutting out a bottom plate, is provided to return the opened out side walls to a mutually parallel positional relationship.

According to the safety belt retractor described in Application Publication No. H7-35805, a belt reel and a belt shaft are manufactured as an integrated belt support, and the belt support is inserted up to a hole height between the two side walls of the casing that open out into a V shape in accordance with deformation of the bottom plate. Next, the two side walls are moved to mutually parallel positions by plastically deforming the bottom plate into a flat shape, and thus the safety belt retractor can be manufactured.

In a method of assembling the safety belt retractor described in Application Publication No. H7-35805, the belt reel (the spindle) is inserted from the inside of the U-shaped casing (the retractor frame) rather than from the outside. Therefore, an additional operating step is required to insert the belt reel by applying force to the casing to cause the casing to deform.

SUMMARY

In consideration of these problems, an object of the present invention is to provide a seatbelt retractor and a spindle incorporation method thereof that do not require deformation of a retractor frame, additional components, and additional operating steps, even when an additional component having a larger diameter than a spindle, such as a load limiter mechanism, is attached to the spindle.

To achieve the above, a representative constitution of a seatbelt retractor according to the present invention includes: a spindle having a recessed portion in a cylindrical surface for retracting a webbing; and a retractor frame including two flat plate-shaped side walls that are provided in parallel via an interval A in order to support the spindle, at least one of the two side walls being provided with a through hole having a height C, into which the spindle is inserted, wherein an element on a first end of the spindle is contained within a range of a distance D from a deepest portion of the recessed portion, an element on a second end of the spindle is contained within a range of a distance B from the deepest portion of the recessed portion, the distance D is smaller than the height C, and the distance B is smaller than the interval A.

Another representative constitution of a seatbelt retractor according to the present invention includes: a spindle having a recessed portion in a cylindrical surface for retracting a webbing; and a retractor frame including two flat plate-shaped side walls that are provided in parallel via an interval A in order to support the spindle, at least one of the two side walls being provided with a through hole having a height C, into which the spindle is inserted, wherein a part extending from a first end of the spindle to the cylindrical surface is included within a range of a distance D from a deepest portion of the recessed portion, a part extending from a second end of the spindle to the cylindrical surface is included within a range of a distance B from the deepest portion of the recessed portion, the distance D is smaller than the height C, and the distance B is smaller than the interval A.

According to these constitutions, even when a component, such as a load limiter mechanism, that has a larger diameter than the spindle is disposed near the second end of the spindle, the spindle can be inserted from the inner side of the retractor frame. More specifically, the first end (the side on which the component is not provided) of the spindle is inserted into the through hole in one side wall from between the two side walls. The spindle is longer than the interval between the two side walls that support the spindle, and therefore the spindle must be tilted when inserted. It would originally be impossible to pass the spindle through the through hole in this tilted attitude. However, by bringing the deepest portion of the recessed portion provided in the cylindrical surface of the spindle into contact with an edge of the through hole, the spindle can be inserted into the through hole even when tilted. Hence, the spindle can be inserted without deforming the retractor frame.

The recessed portion of the spindle is preferably shaped such that the spindle inserted into the through hole from the first end in a tilted attitude can be righted without interfering with the through hole. Alternatively, the recessed portion of the spindle is preferably shaped such that the spindle inserted from between the two side walls into the through hole, from the first end in a tilted attitude can be righted without interfering with the through hole. The reason for this is that as long as a certain condition is satisfied, the spindle can be inserted into the through hole regardless of the shape of the through hole.

Further, according to the above constitutions, in many cases either the spindle can be positioned by being rotated slightly about an axis thereof or the deepest portion of the recessed portion can be brought into contact with the edge of the through hole without the need for any positioning. If the recessed portion is provided only in a narrow range, the spindle often has to be rotated by a large amount in order to position the spindle, leading to an increase in operational complexity. According to the present invention, on the other hand, the spindle can be inserted into the through hole from the inner side of the retractor frame easily.

When a depression forms in the webbing or a winding diameter of the webbing becomes smaller than a predetermined diameter due to the recessed portion provided in the spindle, smooth unreeling of the webbing may be impaired. Therefore, an axial direction width of the recessed portion of the spindle is preferably less than half a width of the webbing wound onto the spindle. As a result, a depression can be prevented from forming in the webbing, and a similar webbing winding diameter to that of a spindle not having a recessed portion can be secured.

To solve the problems described above, a representative constitution of a spindle incorporation method for a seatbelt retractor according to the present invention is a spindle incorporation method for incorporating a spindle for retracting a webbing into a retractor frame including first and second flat plate-shaped side walls that are provided in parallel in order to support the spindle and each have a through hole, wherein a first end of the spindle is inserted into the through hole in the first side wall from between the first and second side walls, a deepest portion of a recessed portion formed in a cylindrical surface of the spindle is brought into contact with an edge of the through hole in the first side wall, the spindle is rotated using the deepest portion of the recessed portion as a rotary center such that an axis of the spindle becomes substantially parallel with a center line passing through respective centers of the through holes in the first and second side walls, and the spindle is moved substantially in parallel to a predetermined incorporation position of the retractor frame.

Constitutional elements and description thereof corresponding to the technical scope of the seatbelt retractor described above may also be applied to the aforesaid spindle incorporation method for a seatbelt retractor.

According to the present invention, it is possible to provide a seatbelt retractor and a spindle incorporation method thereof that do not require deformation of a retractor frame, additional components, and additional operating steps even when an additional component having a larger diameter than a spindle, such as a load limiter mechanism, is attached to the spindle.

BRIEF DESCRIPTION OF THE DRAWINGS

FIG. 8A is an exploded isometric view showing another comparative seatbelt retractor obtained by modifying the seatbelt retractor of FIG. 6A and FIG. 8B is an isometric view of a spindle according to the present invention showing the enlarged diameter component on one end thereof.

DETAILED DESCRIPTION

Figure 1:
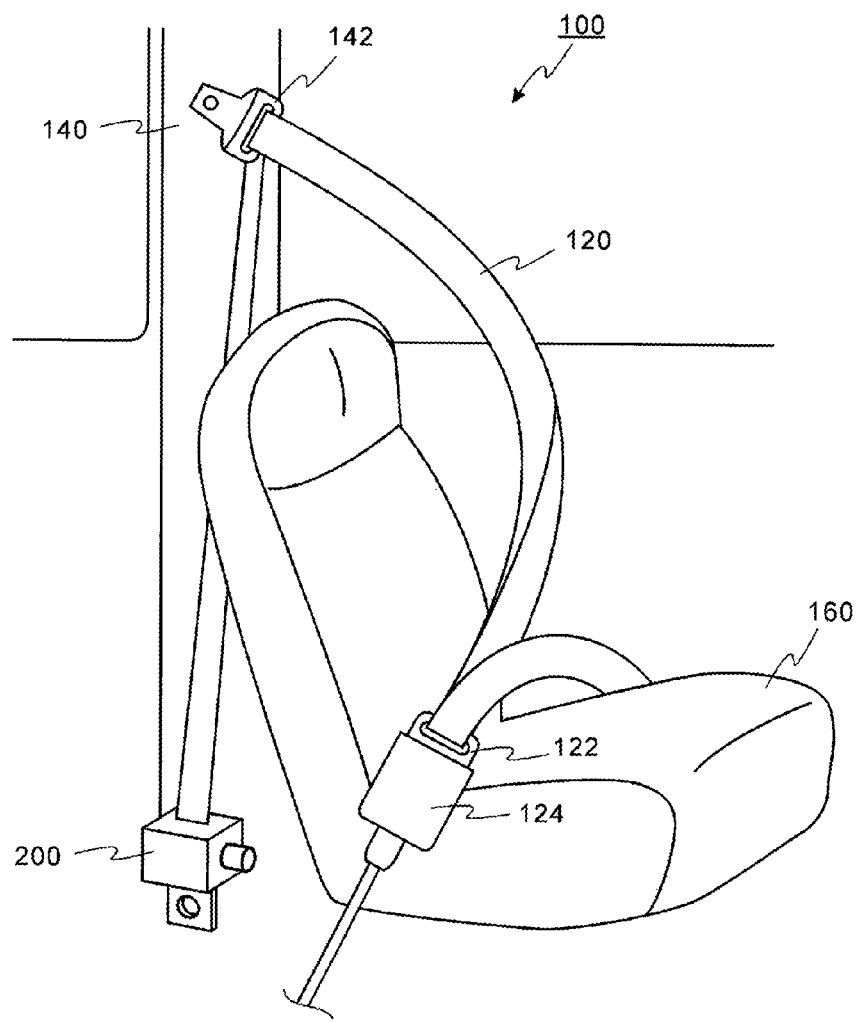
FIG. 1 illustrates a seatbelt device including a seatbelt retractor according to the principles of the present invention.

A preferred embodiment of the present invention will be described in detail below with reference to the attached drawings. Dimensions, materials, other specific numerical values, and so on indicated in this embodiment are merely examples for facilitating comprehension of the invention, and unless indicated otherwise, the present invention is not limited thereto. Note that in the specification and drawings, elements having substantially identical functions and constitutions have been allocated identical reference numerals, and duplicate description thereof has been omitted. Further, elements not directly related to the present invention are not illustrated in the drawings.

FIG. 1 is a view showing a seatbelt device including a seatbelt retractor according to the principles of the present invention. In FIG. 1, a seatbelt device 100 includes a webbing 120 for restraining an occupant, a buckle 124 serving as an attachment/detachment device for the webbing 120, and a retractor 200 for retracting or unreeling the webbing 120. The occupant (not shown) is restrained by the webbing 120.

The retractor 200 is disposed on a center pillar 140 in a vehicle as a device for retracting and unreeling the webbing 120. The retractor 200 may be disposed in a desired location either behind or inside a seat back of a seat 160. The webbing 120 is unreeled from the retractor 200 toward an upper portion of a vehicle body, passed through a through ring 142 disposed on an upper portion of the center pillar 140, and then folded back toward a lower portion of the vehicle body. A tip end portion of the webbing 120 is fixed to an anchor plate (not shown) provided between the center pillar 140 and the seat 160.

A tongue 122 is disposed in a part of the webbing 120 between the through ring 142 and the anchor plate by passing the webbing 120 through the tongue 122. Further, the buckle 124 is disposed on an opposite side of the seat 160 to the anchor plate. The tongue 122 is attached to and detached from the buckle 124, thereby restraining the occupant.

Figure 2:
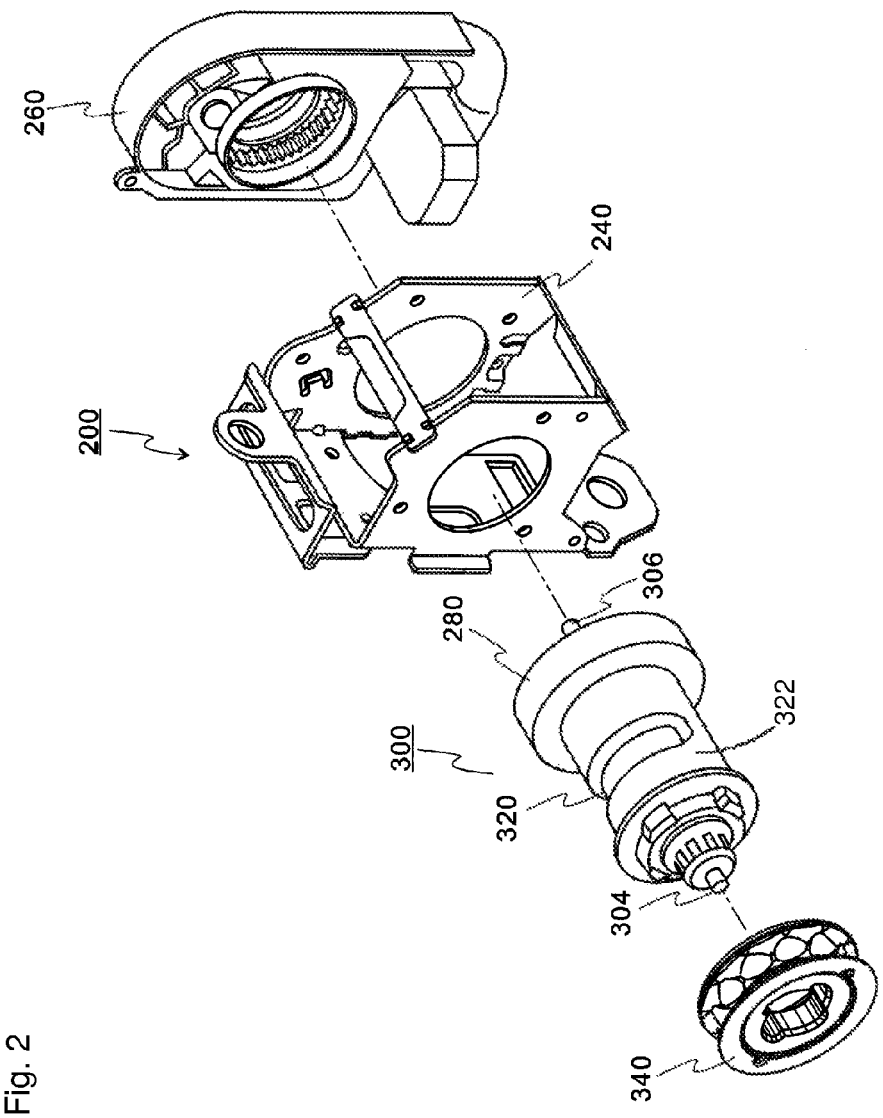
FIG. 2 is a exploded view of the seatbelt retractor of FIG. 1.

FIG. 2 is a view showing the seatbelt retractor of FIG. 1. The retractor 200 includes a spindle 300, a retractor frame 240, and a pretensioner device 260.

The spindle 300 is supported on the retractor frame 240 to be free to rotate, and is used to retract the webbing 120 on a cylindrical surface 322 thereof. The spindle 300 retracts the webbing 120 using force from a retraction spring device 340 disposed on a first end 304 side thereof, an electric motor (not shown), other device and so on.

When the vehicle receives a powerful impact during a collision or the like, the pretensioner device 260 is activated. An explosive is typically used to activate the pretensioner device 260 at this time such that rotation of the spindle 300 is limited by a force of a gas generated when the explosive explodes. As a result, unreeling of the webbing 120 from the retractor 200 is locked, and the slack webbing 120 is retracted instantaneously. Thus, a body of the occupant is prevented from being flung forward by inertial force. However, when the body of the occupant is restrained rapidly, a great load may be exerted on the body of the occupant via the webbing 120.

To mitigate this excessive load, the retractor 200 is further provided with a load limiter mechanism 280. The load limiter mechanism 280 is attached in the vicinity of a second end 306 of the spindle 300. When the pretensioner device 260 is activated by an impact generated during a collision such that a tension of the webbing 120 reaches a predetermined load, an energy absorption member provided in the interior of the load limiter mechanism 280 deforms, causing the spindle 300 to rotate axially in a webbing unreeling direction (a slackening direction). Accordingly, the webbing 120 is unreeled automatically by approximately several cm, and as a result, the excessive load acting on the occupant is mitigated.

Figure 3:
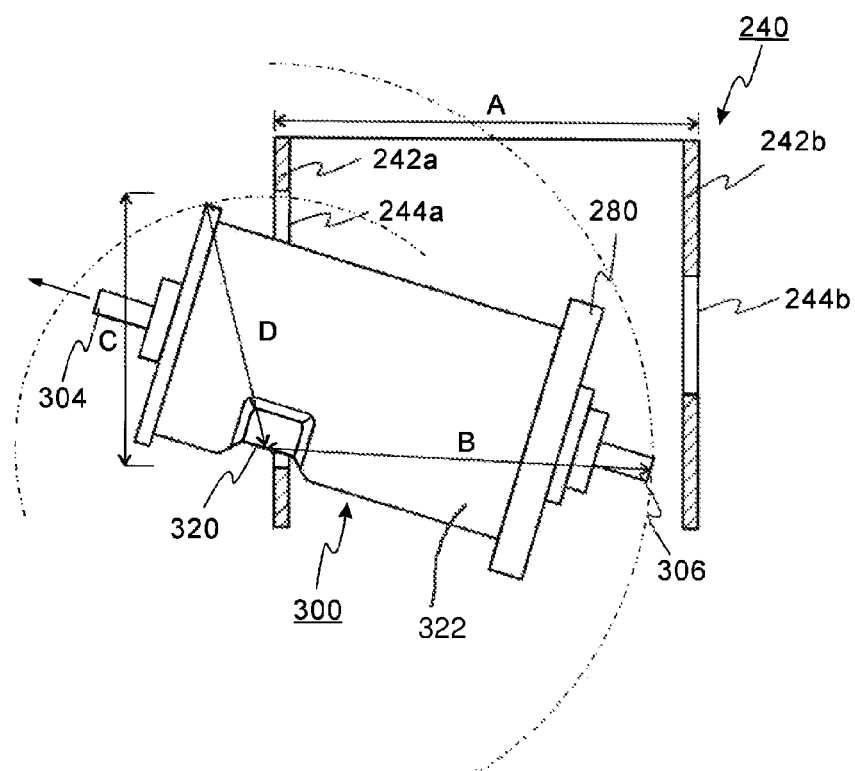
FIG. 3 is a side view with portions cut-away and showing a recessed portion provided in a spindle of FIG. 2.

As shown in FIG. 2, a feature of this embodiment is that a recessed portion 320 is provided in an outer periphery of the cylindrical surface 322 of the spindle 300. Reasons for providing the recessed portion 320 will now be described. FIG. 3 is a view showing the recessed portion 320 provided in the cylindrical surface 322 of the spindle 300 of FIG. 2. The retractor frame 240 includes a first side wall 242a and a second side wall 242b that have a flat plate shape and support the spindle 300. The first side wall 242a and the second side wall 242b are provided in parallel. Further, the first side wall 242a and the second side wall 242b include a first side wall circular through hole (to be referred to hereafter as a first circular through hole) 244a and a second side wall circular through hole (to be referred to hereafter as a second through hole) 244b, respectively.

Figure 6:
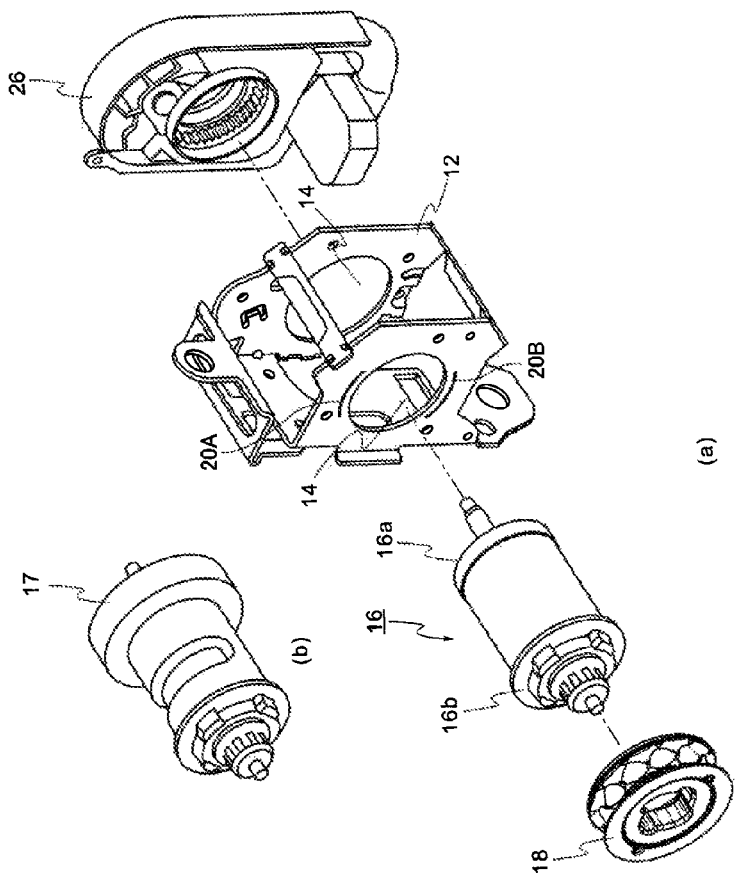
FIG. 6A is an exploded isometric view showing a seatbelt retractor serving as a comparative example and FIG. 6B is an isometric view of a spindle according to the present invention showing the enlarged diameter component on one end thereof.
Figure 7:
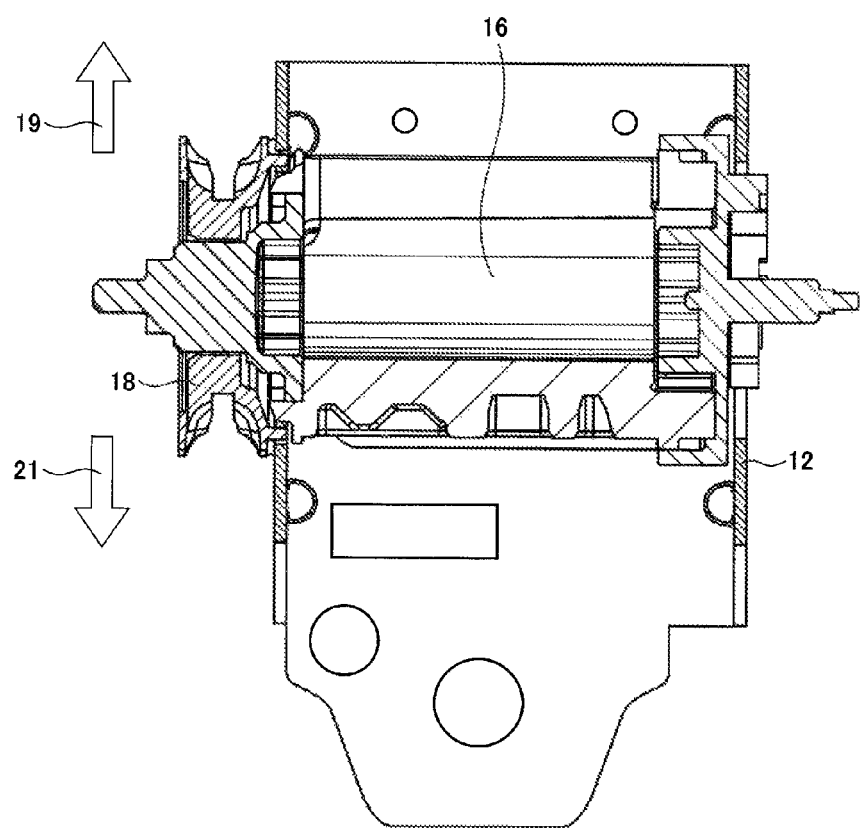
FIG. 7 is a partial sectional view showing the seatbelt retractor of FIG. 6A.

The spindle 300 is rotatably supported by the first circular through hole 244a functioning as a bearing, and therefore the spindle 300 has a substantially equal diameter to a diameter of the first circular through hole 244a. However, the load limiter mechanism 280 attached to the vicinity of the second end 306 of the spindle 300 has a larger diameter than the spindle 300. Therefore, when incorporating the spindle 300 into the retractor frame 240, the spindle 300 cannot be inserted from an outer side of the first circular through hole 244a, in contrast to a typical spindle incorporation method shown in FIG. 6A, for example.

Hence, in this embodiment, as shown in FIG. 3, the recessed portion 320 is provided. Elements on the first end 304 of the spindle 300 are located so as to be contained within a range defined by an arc of a distance D measured from a deepest portion of the recessed portion 320. In other words, a part extending from the first end 304 of the spindle 300 to a cylindrical surface (including a site having a larger diameter than the cylindrical surface 322) thereof is included within the range of the arc that is distance D from the deepest portion of the recessed portion 320. Further, elements on the second end 306 of the spindle 300 are contained within a range defined by an arc of a distance B from the deepest portion of the recessed portion 320. In other words, a part extending from the second end 306 of the spindle 300 to the cylindrical surface (including the load limiter mechanism 280 having a larger diameter than the cylindrical surface 322) thereof is included within the range of the arc that is distance B from the deepest portion of the recessed portion 320. The distance D is smaller than a diameter C of the first circular through hole 244a, and the distance B is smaller than an interval A, which is defined as the distance between the first side wall 242a and the second side wall 242b. As shown in FIG. 3, the deepest portion of the recessed portion 320 is not a single point but extends over a predetermined axial direction width. The entire deepest portion of the recessed portion 320 does not have to satisfy a condition D<C and B<A as long as a point where this condition is satisfied exists in a single location of the deepest portion of the recessed portion 320.

As shown in FIG. 3, the first end 304 (the side on which the load limiter mechanism 280 is not provided) of the spindle 300 is inserted into the first circular through hole 244a from between the two side walls 242a and 242b. An axial direction length of the spindle 300 is greater than the interval A between the first side wall 242a and the second side wall 242b that support the spindle 300, and therefore the spindle 300 must be tilted when inserted, as shown in FIG. 3. It would be impossible to insert the spindle 300 into the first circular through hole 244a in this tilted attitude if the cylindrical surface 322 did not include the recessed portion 320.

In this embodiment, however, the spindle 300 can be inserted into the first circular through hole 244a even when tilted by bringing the deepest portion of the recessed portion 320 provided in the cylindrical surface 322 of the spindle 300 into contact with an edge of the first circular through hole 244a. Hence, during insertion, the retractor frame 240 does not have to be deformed. Components provided near the second end 306 of the spindle 300 are not limited to the load limiter mechanism 280. However, the spindle 300 can be incorporated into the retractor frame 240 even when a component having a larger diameter than the spindle 300 is provided near the second end 306 of the spindle 300.

Figure 4:
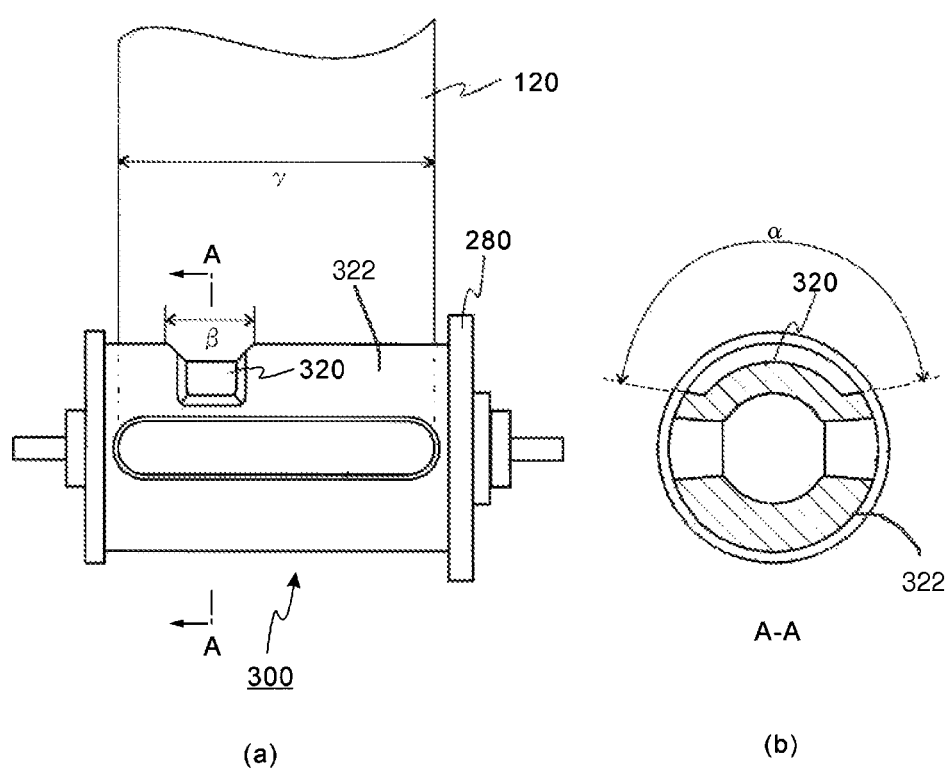
FIG. 4A is a side view and FIG. 4B is a sectional view taken generally along line A-A showing the recessed portion of FIG. 3 in detail.

FIGS. 4A and 4B show the recessed portion 320 of FIG. 3 in detail. FIG. 4A is a front or side view, and FIG. 4B is a sectional view taken along line A-A in FIG. 4A. As shown in FIG. 4B, the recessed portion 320 of the spindle 300 is provided over a predetermined angle α around the shaft of the spindle 300.

If the recessed portion 320 is provided only in pinpoint fashion, i.e. within a narrow range, the spindle 300 must be rotated axially by a large amount in order to incorporate the spindle 300, leading to an increase in operational complexity. When the recessed portion 320 is provided over the predetermined angle α as in this embodiment, however, either the spindle 300 can be positioned by being rotated slightly about the axis thereof or the deepest portion of the recessed portion 320 can be brought into contact with the edge of the circular through hole 244 without the need for any positioning.

In this embodiment, the spindle 300 is inserted into a circular through hole such as the first circular through hole 244a. However, the through hole may take any shape other than a circular shape. In this case, the recessed portion 320 of the spindle 300 may take any shape as long as the spindle 300 inserted into the through hole from the first end 304 in a tilted attitude (FIGS. 5A and 5B) can be righted (FIG. 5C) without interfering with the through hole.

To satisfy the aforesaid condition, an upper limit of the depth of the recessed portion 320 may be determined within a range for securing sufficient strength in the spindle 300, while a lower limit of the depth may be set as close as possible to zero.

When a depression forms in the webbing 120 or a winding diameter of the webbing 120 becomes smaller than a predetermined diameter due to the recessed portion 320 provided in the spindle 300, smooth unreeling of the webbing 120 may be impaired. Therefore, as shown in FIG. 4A, an axial direction width β of the recessed portion 320 is set at less than half a width γ of the webbing 120 wound onto the spindle 300. By setting the recessed portion 320 at the width β, a depression can be prevented from forming in the webbing 120 due to the recessed portion 320, and a similar webbing winding diameter to that of a conventional spindle can be secured.

Figure 5:
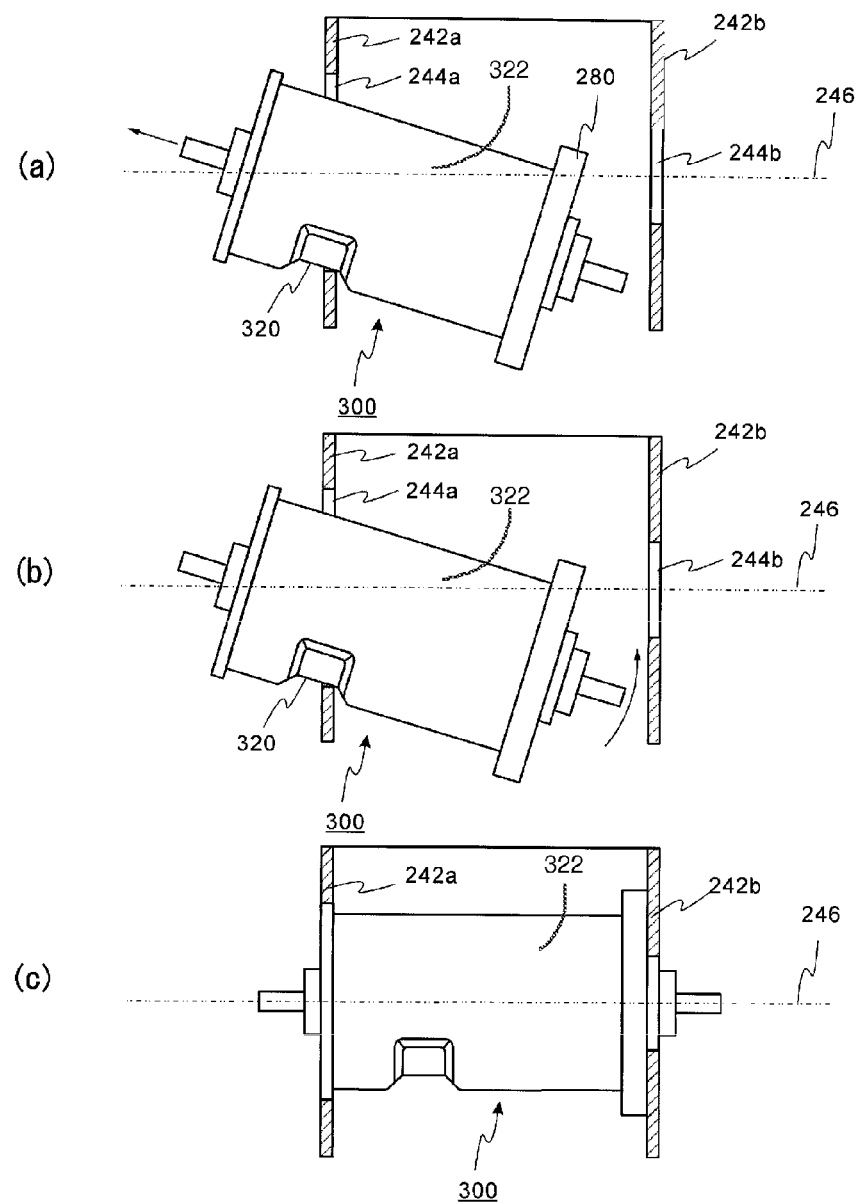
FIGS. 5A-5C are side views showing a method of incorporating the spindle of FIG. 3 into the retractor frame.

FIGS. 5A-5C is a view showing a method of incorporating the spindle of FIG. 3 into the retractor frame 240. To incorporate the spindle 300 into the retractor frame 240, first, as shown in FIG. 5A, the first end of the spindle 300 is inserted through the first circular through hole 244a in the first side wall 242a of the retractor frame 240 in a tilted condition and from a location between the first side wall 242a and the second side wall 242b. The deepest portion of the recessed portion 320 provided in the cylindrical surface 322 of the spindle 300 is then brought into contact with the edge of the first circular through hole 244a.

Next, as shown in FIG. 5B, the spindle 300 is rotated about the deepest portion of the recessed portion 320 contacting the edge of the first circular through hole 244a so that the axis of the spindle 300 becomes substantially parallel with a center line 246 passing through respective centers of the first circular through hole 244a and the second circular through hole 244b.

Further, as shown in FIG. 5C, the spindle 300 is incorporated into the retractor frame 240 by being moved substantially in parallel to a predetermined incorporation position of the retractor frame 240.

By incorporating the spindle 300 into the retractor frame 240 in the manner described above, the spindle can be inserted into the circular through hole 244a from the inner side of the retractor frame 240 easily without the need for additional components and assembly steps.

A preferred embodiment of the present invention was described above with reference to the attached drawings, but the above embodiment is merely a preferred example of the present invention, and other embodiments may be implemented or executed using various methods. Unless specific limiting description to the contrary is provided in the specification of the present application, the present invention is not limited to the component shapes and sizes, the constitutional layouts, and so on illustrated in detail in the attached drawings. Further, expressions and terms used in the specification of the present application are employed for descriptive purposes only, and unless specific limiting description is provided to the contrary, the present invention is not limited to these expressions and terms.

What is claimed is:

1. A seatbelt retractor comprising:
a spindle having a recessed portion in a cylindrical surface for retracting a webbing; and
a retractor frame including two flat plate-shaped side walls that are provided in parallel and spaced apart at an interval (A) in order to support the spindle, at least one of the two side walls being provided with a through hole having a diameter (C);
elements on a first end of the spindle, all of the elements on the first end of the spindle being contained within a range of an arc defined by a first distance (D) measured from a deepest portion of the recessed portion,
elements on a second end of the spindle, all of the elements on the second end of the spindle being contained within a range of an arc defined by a second distance (B) from the deepest portion of the recessed portion, one of the elements on the second end of the spindle defining an effective diameter that is larger than the diameter (C) of the through hole, and
the first distance (D) is smaller than the diameter (C), and the second distance (B) is smaller than the interval (A).

2. The seatbelt retractor according to claim 1, wherein the recessed portion of the spindle is shaped such that the spindle inserted into the through hole from the first end in a tilted attitude can be righted without interfering with the through hole.

3. A seatbelt retractor comprising:
a spindle having a recessed portion in a cylindrical surface for retracting a webbing; and
a retractor frame including two flat plate-shaped side walls that are provided in parallel and spaced apart at an interval (A) in order to support the spindle, at least one of the two side walls being provided with a through hole having a diameter (C), into which the spindle is inserted,
wherein a part including a first end of the spindle and extending to the cylindrical surface is completely included within a range of an arc defined by a first distance (D) measured from a deepest portion of the recessed portion,
a part including a second end of the spindle and extending to the cylindrical surface is completely included within a range of an arc defined by a second distance (B) measured from the deepest portion of the recessed portion, the part extending from the second end of the spindle defines an effective diameter that is larger than diameter (C), and
the first distance (D) is smaller than the diameter (C), and the second distance (B) is smaller than the interval (A).

4. The seatbelt retractor according to claim 3, wherein the recessed portion of the spindle is shaped such that the spindle inserted from between the two side walls into the through hole, from the first end in a tilted attitude can be righted without interfering with the through hole.

5. The seatbelt retractor according to claim 3, wherein an axial direction width of the recessed portion of the spindle is less than half a width of the webbing wound onto the spindle.

6. A spindle incorporation method for a seatbelt retractor, for incorporating a spindle for retracting a webbing into a retractor frame comprising the steps of providing generally parallel flat plate-shaped first and second side walls to support the spindle and each of the first and second side walls having a through hole, inserting a first end of the spindle into the through hole in the first side wall from a location between the first and second side walls, and during insertion, bringing a deepest portion of a recessed portion formed in a cylindrical surface of the spindle into contact with an edge of the through hole in the first side wall, rotating a second end of the spindle using the deepest portion of the recessed portion as a rotary center such that a central axis through the second end of the spindle becomes substantially parallel with a center line passing through respective centers of the through holes in the first and second side walls, an element on the second end of the spindle defining an effective diameter that is greater than the diameter of the through hole in the first side wall, and moving the spindle into a position that is substantially parallel to a predetermined incorporation position of the retractor frame.

\* \* \* \* \*